(12) United States Patent
Candelore et al.

(10) Patent No.: US 12,549,821 B1
(45) Date of Patent: *Feb. 10, 2026

(54) USER PLACEMENT OF CLOSED CAPTIONING

(71) Applicant: Saturn Licensing LLC, New York, NY (US)

(72) Inventors: Brant Candelore, Escondido, CA (US); Mahyar Nejat, San Diego, CA (US); Peter Shintani, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,986

(22) Filed: Aug. 20, 2021

Related U.S. Application Data

(63) Continuation of application No. 16/537,267, filed on Aug. 9, 2019, now Pat. No. 11,115,725, which is a continuation of application No. 15/646,297, filed on Jul. 11, 2017, now Pat. No. 10,425,696.

(51) Int. Cl.
  *H04N 21/488* (2011.01)
  *H04N 21/43* (2011.01)
  *H04N 21/431* (2011.01)
  *H04N 21/439* (2011.01)

(52) U.S. Cl.
  CPC ..... *H04N 21/4884* (2013.01); *H04N 21/4307* (2013.01); *H04N 21/4316* (2013.01); *H04N 21/4394* (2013.01)

(58) Field of Classification Search
  None
  See application file for complete search history.

(56) References Cited

U.S. PATENT DOCUMENTS

| | | | |
|---|---|---|---|
| 5,828,416 A * | 10/1998 | Ryan | H04N 21/434 348/E5.005 |
| 8,713,625 B2 | 4/2014 | Blanchard et al. | |
| 9,131,280 B2 | 9/2015 | Xiong et al. | |
| 9,451,207 B2 | 9/2016 | Mountain | |
| 9,568,997 B2 | 2/2017 | Wilairat et al. | |
| 10,304,458 B1 * | 5/2019 | Woo | G10L 17/02 |
| 2007/0253680 A1 * | 11/2007 | Mizote | H04N 21/4884 386/230 |
| 2008/0293443 A1 * | 11/2008 | Pettinato | G06F 9/542 704/235 |
| 2008/0295040 A1 | 11/2008 | Crinon | |
| 2009/0162036 A1 * | 6/2009 | Fujii | H04N 5/85 386/E5.068 |
| 2009/0228948 A1 | 9/2009 | Guarin et al. | |
| 2010/0014595 A1 * | 1/2010 | Platzer | H04N 21/440218 375/E7.02 |
| 2010/0111322 A1 | 5/2010 | Park | |
| 2010/0303159 A1 | 12/2010 | Schultz et al. | |

(Continued)

FOREIGN PATENT DOCUMENTS

| FR | 2850821 A1 | 8/2004 | |
|---|---|---|---|
| WO | WO-2016039285 A1 * | 3/2016 | G06F 13/00 |

*Primary Examiner* — Jason K Lin
(74) *Attorney, Agent, or Firm* — Richard LaPeruta

(57) ABSTRACT

Placement of Closed Captioning (CC) in content by a content provider is overridden by means of a user interface (UI) that allows the user to place CC on screen on top of the video. The CC may be derived directly from the audio and synchronized with play of the audio and video.

22 Claims, 3 Drawing Sheets

(56) References Cited

U.S. PATENT DOCUMENTS

| | | |
|---|---|---|
| 2011/0173537 A1 | 7/2011 | Hemphill |
| 2013/0027613 A1* | 1/2013 | Kim .................... H04N 21/4316 |
| | | 348/563 |
| 2013/0262123 A1* | 10/2013 | Boukadakis ............ G10L 15/00 |
| | | 704/270.1 |
| 2014/0123195 A1* | 5/2014 | Han ................... H04N 21/2362 |
| | | 725/88 |
| 2014/0136195 A1 | 5/2014 | Abdossalami et al. |
| 2015/0172766 A1* | 6/2015 | Shin ........................ G06F 3/167 |
| | | 725/38 |
| 2015/0363389 A1 | 12/2015 | Zhang et al. |
| 2016/0066055 A1* | 3/2016 | Nir ................... H04N 21/42203 |
| | | 725/35 |
| 2016/0098849 A1 | 4/2016 | Shintani et al. |
| 2016/0100213 A1 | 4/2016 | Song et al. |
| 2016/0119438 A1* | 4/2016 | Abramson ....... H04N 21/25841 |
| | | 709/217 |
| 2018/0174600 A1* | 6/2018 | Chaudhuri ....... H04N 21/44008 |
| 2018/0220201 A1* | 8/2018 | Stoksik ............ H04N 21/25891 |
| 2018/0227424 A1 | 8/2018 | Dorsey et al. |
| 2018/0337964 A1 | 11/2018 | Caramma |

\* cited by examiner

USER PLACEMENT OF CLOSED CAPTIONING

FIELD

The present application relates to technically inventive, non-routine solutions that are necessarily rooted in computer technology and that produce concrete technical improvements.

BACKGROUND

One of the biggest complaints with Closed Captioning is that (CC) because it is overlaid on the video it interferes with the display of the video. It can obscure faces, gestures, and action shown in the video as well as scrolling banners that may be delivered as part of the video.

One of the ways to mitigate the problem, if allowed by the display device, is to minimize the size of the CC text so that it does not obscure as much video. This may make it difficult to read depending on how close the view is to the TV. And even then, the CC can be misplaced and it will obscure some critical aspect of the video. Furthermore, particularly for live events in which the broadcaster's closed captioning is typically typed in by a stenographer as people speak and thus noticeably lags the speech itself and accompanying video, the loss of synchronization is between the CC and speech is distracting and can be disorienting to hearing-impaired people who may be attempting to both lip read the speakers and read the CC.

SUMMARY

Present principles recognize the above problems and so provide a system with a first decoder for decoding audio received at an audio video device (AVD) at a first time, and a speech-to-text (STT) converter receiving output from the first decoder to render closed captioning (CC). A second decoder decodes the same audio but at a second time later than the first time to generate decoded audio. At least one speaker plays the decoded audio while at least one display presents the CC in synchronization with playing the decoded audio on the at least one speaker.

The first decoder may be implemented by a network server system and the second decoder may be implemented by the AVD. The STT converter can be implemented by the network server system. In other embodiments, the first decoder is implemented by the AVD.

In example implementations, the display is configured to present video associated with the audio in a window that is less than all of a video display area of the display. In non-limiting examples, the window includes only first and second corners of the video display area, with the CC being presented in a CC region outside of the window.

In some non-limiting examples, the display may be configured to present at least one user interface (UI) enabling selection to present the CC rendered by the STT converter and selection to present CC received from a content source in lieu of or in addition to CC rendered by the STT converter.

In another aspect, a device includes at least one computer storage that is not a transitory signal and that in turn includes instructions executable by at least one processor to decode first audio received at a display device at a first point in time using a first decoder implemented by the display device or by a network server receiving the first audio from the display device. The instructions are executable to generate text from the first audio received from the first decoder, and to decode the first audio at a second point of time later than the first point in time using a second decoder. Furthermore, the instructions are executable to present the text on a display in synchronization with playing the first audio decoded by the second decoder on at least one speaker of the display device.

In another aspect, a server system includes at least one server processor and at least one server computer storage with instructions executable by the at least one server processor for receiving audio via a network from an end user display device. The instructions also are executable for decoding the audio to render decoded audio, and for sending the decoded audio or a text representation thereof back to the end user display device via the network.

The details of the present disclosure, both as to its structure and operation, can be best understood in reference to the accompanying drawings, in which like reference numerals refer to like parts, and in which:

DETAILED DESCRIPTION

Figure 1:
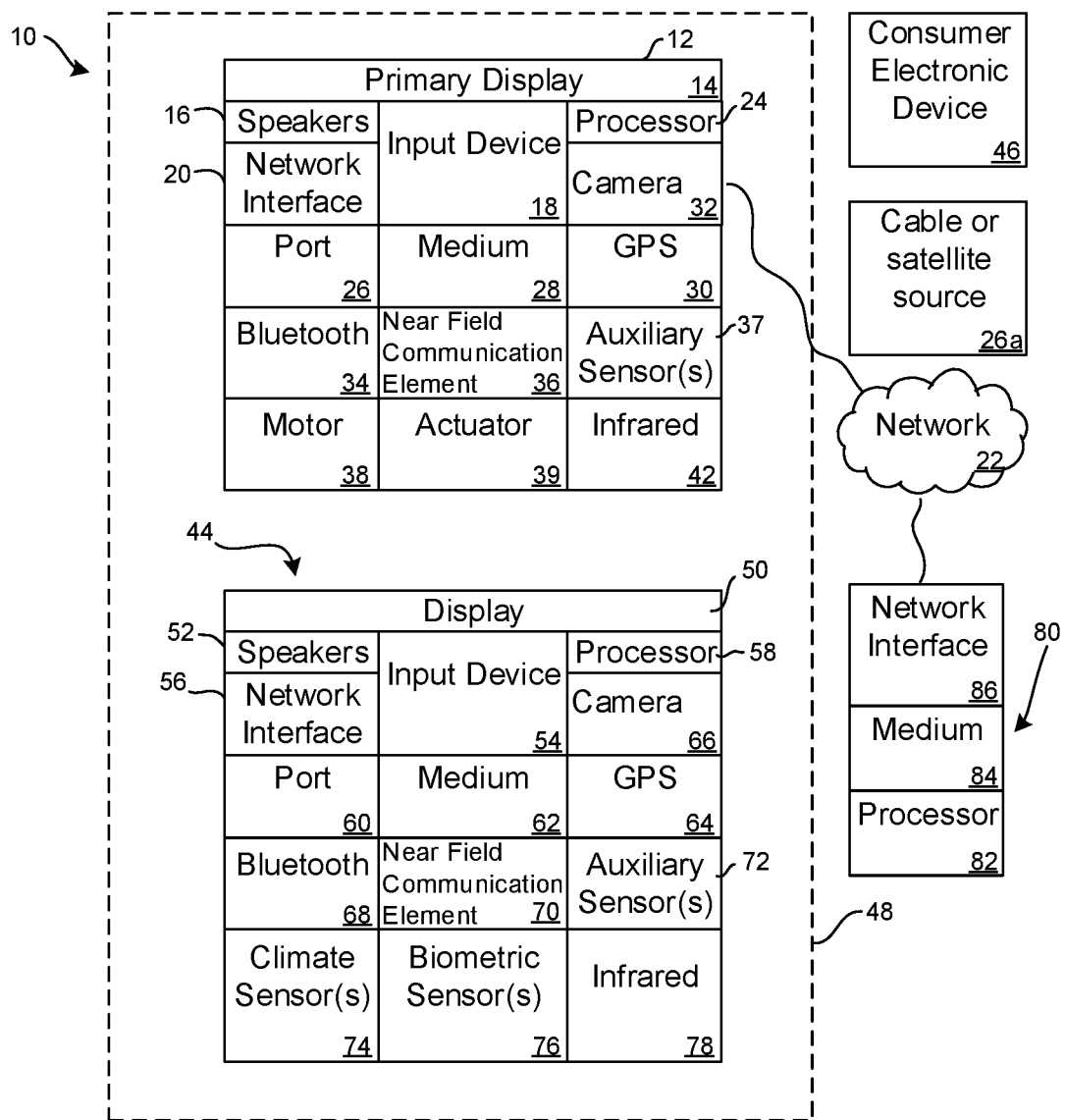
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C #or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
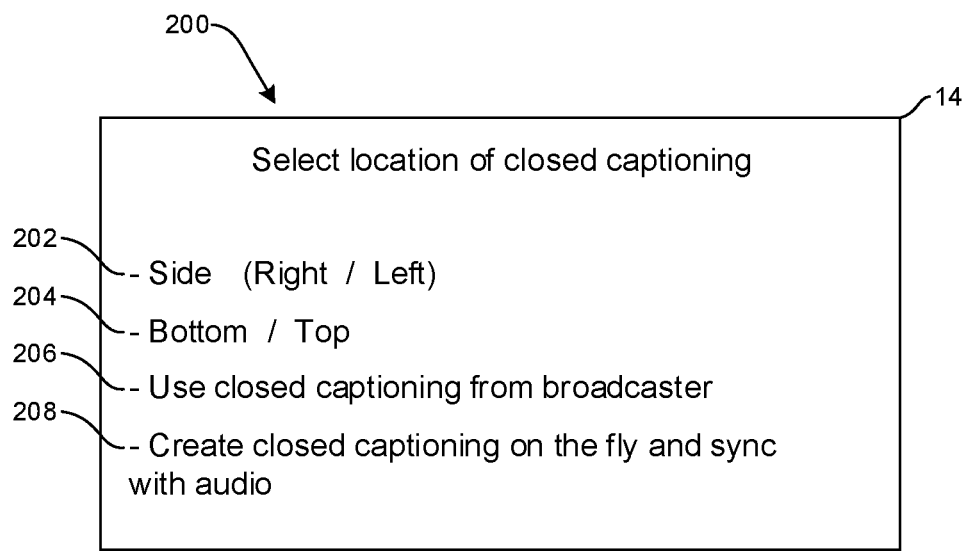
FIG. 2 is a screen shot of an example user interface (UI) allowing a user to select where in a display closed caption (CC) is to be presented.

FIG. 2 shows a user interface (UI) 200 that may be presented on the display 14 of the AVD (equivalently, it may be presented audibly on, e.g., the speakers 16) to enable a person to select a location at which closed captioning (CC) is to appear. The CC may be that received from the content provider and/or that generated dynamically as described further below.

As shown, the UI 200 includes a side selector 202 with left and right sub-selectors selectable to cause CC to be presented on, respectively, left and/or right borders of the display region. The UI 200 also includes top and bottom selectors 204 selectable to cause CC to be presented on, respectively, top and/or bottom borders of the display region. A broadcast selector 206 may be included and may be selectable to cause the CC that is to be presented to be that received from a content provider such as a broadcaster, while a dynamic CC selector 208 may be provided and may be selectable to cause the CC that is to be presented to be that which is generated dynamically from the program audio and synchronized therewith as described further below.

Figure 3:
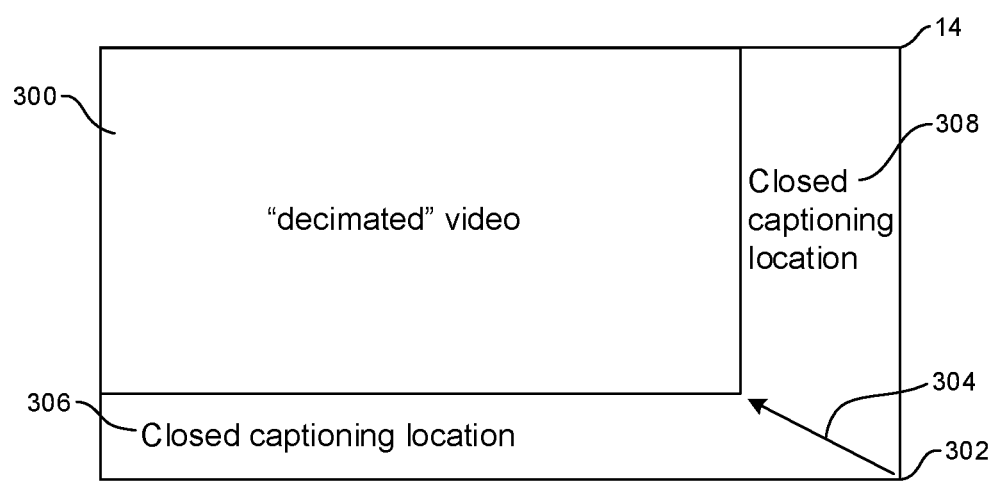
FIG. 3 is a screen shot of decimated video on a display with closed captioning appearing according to selections made using, e.g., the UI of FIG. 2.

FIG. 3 illustrates the results of one or more selections from FIG. 2. The video, reduced as by decimation, is presented in a window 300 the lower right corner of which has been moved up and left from the lower right corner 302 of the display region as indicated by the arrow 304. It is to be understood that the decimated video window may alternatively be moved down and left from the upper right control of the display region, down and right from upper left corner of the display region, or up and right from the lower left corner of the display region.

In this way, a bottom border region 306 is provided for presenting CC in. Also, a right-side region 308 is made available for presenting CC in.

Figure 4:
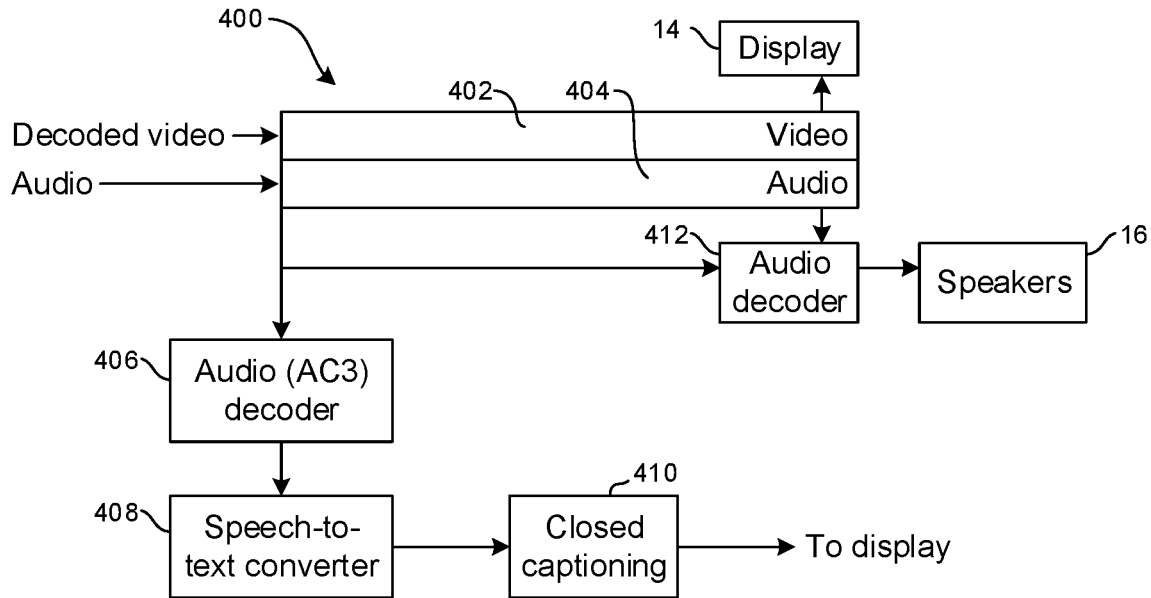
FIG. 4 is a schematic diagram showing dual decoding of buffered audio to generate CC and decoded audio.

FIG. 4 is a schematic diagram of a system for generating CC dynamically from input audio. A data buffer 400 that may be maintained by the AVD 12 and/or shared with a cloud server buffers incoming video 402 and related incoming audio 404. For disclosure purposes assume data flows right to left in the buffer 400 on a first in-first out basis.

A first audio decoder decodes audio 404 at a first point of time in the buffer, e.g., as soon as the audio enters the buffer. The decoded audio is converted to text by a speech-to-text converter 408 and output as CC 410. The first audio decoder may be implemented by an AC3 decoder and the STT converter may be implemented by a processor executing STT software, such as the processor of the AVD or a separate STT processor on, e.g., a field programmable gate array (FPGA).

As the audio is decoded and converted, the timing information (such as digital timestamps) accompanying the audio are preserved, so that the CC 410 has the same timing information as the corresponding audio from which it has been derived. The first decoder 406 may be implemented by the AVD or by a cloud server to which the AVD sends the audio. In the latter case, the need for the AVD to include two decoders, such as two AC3 decoders with attendant two license fees, is eliminated. When the first decoder is implemented by a network server, the CC 410 is sent back to the AVD from the server.

A second audio decoder 412 decodes the same audio as the first audio decoder 406 but further along in the buffer 400 as the audio progresses through the buffer. The second decoder 412 may be implemented by the AVD. The latency between the buffer locations at which the decoders 406, 412 decode the audio is preferably sufficient to allow the first decoder and STT converter 408 time to receive the audio and generate the CC 410 prior to presenting decoded audio from the second decoder 412 on the speakers 16 of the AVD 12.

Although no video decoders are shown in FIG. 4 for simplicity of disclosure, it is to be understood that the video 402 also is decoded. The decoded video is then presented on the display 14 synchronized by means of the timing information accompanying the video 402 and its associated audio 404 with the audio played on the speakers 16. It will readily be appreciated that the dynamically generated CC 410 is also presented on the display 14, synchronized with the audio being played on the speakers, such that a hearing-impaired person, for example, can read the CC simultaneously as a character in the video is speaking the audio, and not sometime after as typically occurs with broadcast CC of live events, for instance.

Figure 5:
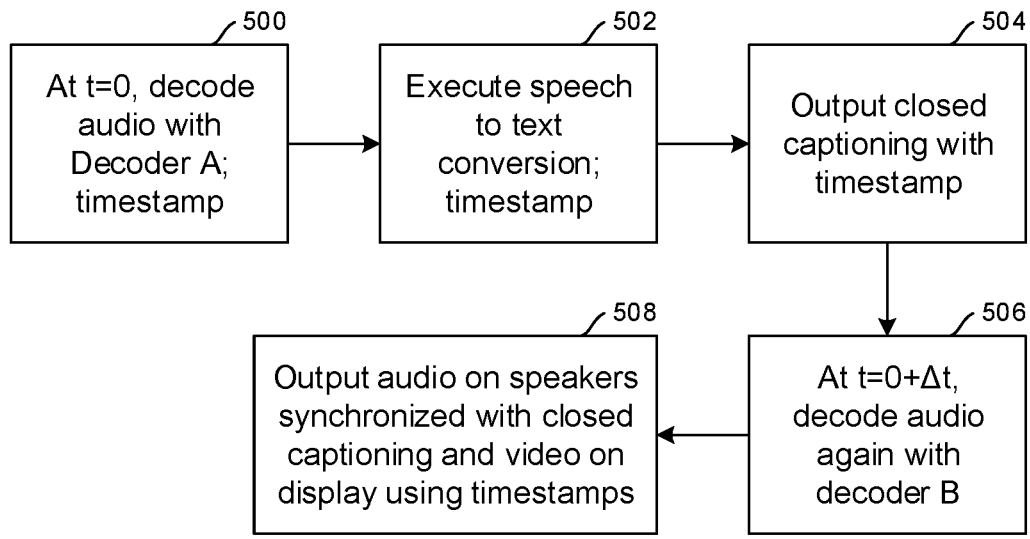
FIG. 5 is a flow chart of example logic illustrating synchronization of locally-generated CC with audio and video presentation.

FIG. 5 illustrates the above in example non-limiting logic flow format. At block 500, at a time=$t_0$, audio is decoded with the first decoder and the timing information retained. STT is executed at block 502, e.g., by the STT converter 408, with the timing information being transferred to the text, which is output at block 504 as the CC 410.

Sometime later, at a time=$t_0+\Delta t$, the same audio is decoded at block 506 by the second decoder 412. Block 508 indicates that the audio decoded by the second decoder is played on the speakers 16 in synchronization with the CC generated by the first decoder and STT converter, using the timing information. The processor of the AVD can coordinate this synchronization by playing audio and presenting CC simultaneously on the display that has timing information matching the audio being played at the same time.

In some embodiments, present principles annotate the closed captioning per speaker to ease attempts for the hearing impaired to read closed captioning. During the speech to text conversion, the process may note a change in speaker in the audio. In an example, the process can note that the voice fingerprint of the speech being converted to text has changed. This may be done by periodically executing a voice fingerprint on received speech in audio and entering a data structure of template fingerprints to determine what specific individual is speaking (by, for instance, finding a match to the voice fingerprint that correlates to a specific individual) or what generic speaker is speaking (by, for instance, finding a match to the voice fingerprint that correlates to a type of individual, such as man, woman, child, etc.) The closed captioning can annotate the specific or generic individual whose speech is being reproduced by text, e.g., when a man speaks "Hi, I want to say something", the reproduced text may read: "Man: Hi, I want to say something", and if a female speaker in the audio responds "What did you want to say?", the reproduced text may read: "Woman: What did you want to say?". Or, the speakers can be designated as "speaker 1", "speaker 2", . . . .

While particular techniques are herein shown and described in detail, it is to be understood that the subject matter which is encompassed by the present application is limited only by the claims.

What is claimed is:

1. An audio video display device assembly comprising:
  an electronic device that comprises a microphone configured to receive audible commands; and an audio video display device includes:
a display;
a processor that controls the display;
a wireless interface to connect to the electronic device that comprises a Bluetooth transceiver or a Near Feld Communication element to receive the audible commands; and
a user interface;
wherein the user interface is configured to enable a selection to present closed captioning (CC) rendered by a speech-to-text (STT) converter;
wherein the audio video display device is configured to simultaneously annotate the CC to correlate to a specific speaker;
wherein the audio video display device is configured to communicate with a first decoder for decoding audio received at the audio video display device at a first time in which the first decoder is implemented via a cloud system in which timing information of the CC is implemented by the cloud system; and
wherein the audio video display device is configured to decode the audio at a second time later than the first time to generate decoded audio.

2. The audio video display device assembly of claim 1, wherein the STT converter is implemented by the cloud system, and the audio video display device is configured to receive.

3. The audio video display device assembly of claim 2, wherein the audio video display device is configured to interact with a second decoder for communicating for decoding the audio at the second time.

4. The audio video display device assembly of claim 3, wherein, at least one of the decoders is implemented on a server configured to communicate with the audio video display device over a network.

5. The audio video display device assembly of claim 4, comprising at least one speaker for playing the decoded audio.

6. The audio video display device assembly of claim 5, wherein the audio video display device presents the CC in synchronization with playing the decoded audio from the second decoder on the at least one speaker using the timing information.

7. The audio video display device assembly of claim 6, wherein the first decoder comprises an AC3 decoder.

8. The audio video display device assembly of claim 7, wherein the STT converter comprises a field programmable gate array.

9. The audio video display device assembly of claim 8, wherein the STT converter comprises a processor in the audio video display device.

10. The audio video display device assembly of claim 9, wherein the display is configured to present video associated with the audio in a window comprising less than all of a video display area of the display, the window comprising only first and second corners of the video display area, the CC being presented in a CC region outside of the window.

11. The audio video display device assembly of claim 9, wherein the display is configured to present the user interface enabling selection to present the CC rendered by the STT converter and selection to present CC received from a content source in lieu of or in addition to the CC rendered by the STT converter.

12. The audio video display device assembly of claim 1, wherein the display is configured to display images at 4K resolution.

13. The audio video display device assembly of claim 1, wherein the audio video display device is configured to be touch-enabled.

14. The audio video display device assembly of claim 1, wherein the electronic device comprises multiple cameras, a geographic position receiver, and a biometric sensor.

15. The audio video display device assembly of claim 1, wherein the audio video display device comprises a position or location receiver.

16. A method presenting of audio video content, comprising:
receiving audible commands by a microphone of an electronic device;
selecting a present closed captioning (CC) rendered by a speech-to-text (STT) converter from a user interface;
displaying the audio video content on an audio video display device;
annotating simultaneously the CC to correlate to a specific speaker;
wirelessly connecting the electronic device that comprises a Bluetooth transceiver or a Near Feld Communication element to receive the audible commands;
communicating, by the audio video display device, with a first decoder to decode audio received at the audio video display device at a first time, the first decoder being implemented via a cloud system in which timing information of the CC is implemented by the cloud system; and
decoding, by the audio video display device, the audio at a second time later than the first time to generate decoded audio.

17. The audio video display device assembly of claim 1, wherein the annotation of the CC is responsive to a change in the speaker.

18. The audio video display device assembly of claim 1, wherein the annotation of the CC is responsive to a voice fingerprint of the specific speaker.

19. The method of claim 16, further comprising executing a voice fingerprinting of the specific speaker.

20. The audio video display device assembly of claim 1, wherein the annotation of the CC includes an indicator of the specific speaker.

21. The method of claim 16, wherein the annotating of the CC includes an indicator of the specific speaker.

22. An audio video display device comprising:
a processor that controls display; and
a user interface;
wherein the user interface is configured to enable a selection to present closed captioning (CC) rendered by a speech-to-text (STT) converter;
wherein the audio video display device is configured to simultaneously annotate the CC to correlate to a specific speaker;
wherein the audio video display device is configured to communicate with a first decoder for decoding audio received at the audio video display device at a first time in which the first decoder is implemented via a cloud system in which timing information of the CC is implemented by the cloud system; and
wherein the audio video display device is configured to decode the audio at a second time later than the first time to generate decoded audio.

* * * * *